(12) United States Patent
Lin et al.

(10) Patent No.: US 9,166,734 B2
(45) Date of Patent: Oct. 20, 2015

(54) METHOD AND DEVICE FOR FRAME AGGREGATION TRANSMISSION OF WIRELESS NETWORK SYSTEM

(71) Applicant: National Cheng Kung University, Tainan (TW)

(72) Inventors: Hui-Tang Lin, Tainan (TW); Ying-You Lin, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 127 days.

(21) Appl. No.: 13/967,141

(22) Filed: Aug. 14, 2013

(65) Prior Publication Data

US 2015/0049677 A1    Feb. 19, 2015

(51) Int. Cl.
| H04W 28/04 | (2009.01) |
| H04W 72/04 | (2009.01) |
| H04W 88/08 | (2009.01) |
| H04L 1/00  | (2006.01) |
| H04W 4/00  | (2009.01) |

(52) U.S. Cl.
CPC .................................. H04L 1/0011 (2013.01)

(58) Field of Classification Search
CPC ... H04W 28/04; H04W 72/04; H04W 72/042; H04W 88/08; H04L 5/0007
USPC ......................................................... 370/329
See application file for complete search history.

(56) References Cited

U.S. PATENT DOCUMENTS

| 6,421,387 | B1 * | 7/2002 | Rhee ........................ 375/240.27 |
| 6,654,419 | B1 * | 11/2003 | Sriram et al. ............ 375/240.12 |
| 7,460,524 | B2 * | 12/2008 | Khan ............................ 370/353 |
| RE43,741 | E * | 10/2012 | Shokrollahi et al. ............ 341/50 |
| 8,479,082 | B2 * | 7/2013 | Bose ............................ 714/776 |
| 8,780,693 | B2 * | 7/2014 | Kim et al. ..................... 370/216 |
| 2005/0015703 | A1 * | 1/2005 | Terry et al. ................... 714/776 |
| 2005/0152358 | A1 * | 7/2005 | Giesberts et al. ............. 370/389 |
| 2008/0101355 | A1 * | 5/2008 | Ojala et al. .................... 370/389 |
| 2008/0130538 | A1 * | 6/2008 | Raissinia et al. .............. 370/310 |
| 2009/0201898 | A1 * | 8/2009 | Gong et al. .................... 370/338 |
| 2010/0046371 | A1 * | 2/2010 | Sundararajan et al. ....... 370/235 |
| 2011/0041041 | A1 * | 2/2011 | Kim ............................. 714/780 |
| 2014/0317222 | A1 * | 10/2014 | Li et al. ........................ 709/213 |
| 2014/0341023 | A1 * | 11/2014 | Kim et al. ................... 370/230.1 |
| 2015/0016332 | A1 * | 1/2015 | Fischer et al. ................ 370/312 |

* cited by examiner

*Primary Examiner* — Mark Rinehart
*Assistant Examiner* — Sanjay K Dewan
(74) *Attorney, Agent, or Firm* — Locke Lord LLP; Tim Tingkang Xia, Esq.

(57) ABSTRACT

The invention directed to an efficient frame aggregation transmission scheme with network coding to improve transmission efficiency in 802.11n/ac networks. According to network conditions, the proposed scheme can dynamically utilizes either modified systematic network coding or mixed generation coding to efficiently transmit the aggregated frame.

6 Claims, 6 Drawing Sheets

METHOD AND DEVICE FOR FRAME AGGREGATION TRANSMISSION OF WIRELESS NETWORK SYSTEM

FIELD OF THE INVENTION

The present invention relates to a method of frame aggregation transmission, more particularly, to a method of frame aggregation transmission with network coding to improve transmission efficiency, and a wireless communication device using the same.

BACKGROUND OF THE INVENTION

Next Generation Wireless Local Area Networks (WLANs), 802.11n and 802.11 ac, are expected to provide efficient, ubiquitous, and high-speed Internet access for multimedia applications such as HDTV (20 Mbps) and DVD (9.8 Mbps). To ensure user satisfaction, the Quality of Service (QoS) provided by WLANs should be comparable to that of wired networks. As a result, several recent 802.11n/ac amendments have proposed frame aggregation and Block Acknowledgement (BA) techniques for improving the transmission efficiency by reducing the MAC/PHY overhead.

However, the inherent error-prone nature of wireless communications results in a high packet error rate and the corrupted aggregated frame causes significant retransmission overhead. Consequently, an urgent requirement exists for efficient retransmission schemes to enhance the performance of high-speed WLANs.

Referring the FIG. 1 is a flowchart of stop and wait scheme when error happened in the traditional 802.11n/ac. If one of the MPDUs within A-MPDU has not been positively acknowledged or reach the retry limitation, the whole frame should be retransmitted.

Hybrid Automatic Repeat reQuest (HARQ) error-control methods have been widely used to mitigate packet losses in wireless systems. Although the Hybrid Automatic Repeat reQuest (HARQ) error-control method recovers from packet loss, it has low transmission efficiency and is unsuitable for frame aggregation transmission of 802.11n/ac. However, most HARQ schemes do not account for frame aggregation effects.

In an attempt to address this problem, the inventor has presented several Aggregated Selective Repeat (ASR) ARQ schemes in "Novel Design and Analysis of Aggregated ARQ Protocols for IEEE 802.11n Networks" IEEE Trans. on Mobile Computing. FIG. 2 shows the flow diagram of MPDUs de-aggregation procedure for ASR-ARQ scheme. Using compressed Block ACK (BA) for acknowledging the entire A-MPDU; checking if each MPDU with A-MPDU is correct via frame check sequence (FCS); and retransmitting unsuccessfully transmitted MPDUs until all the MPDUs within A-MPDU have either been positively acknowledged or reached the retry limitation. However, the retransmitted packets do not fully utilize the potential benefits of frame aggregation since they only be retransmitted alone without aggregating with new packets. That is, the protocols follow the conventional ASR scheme in only sending the retransmitted packets in the next frame.

ASR-ARQ does not make efficient use of the available bandwidth since only the packet(s) corresponding to corrupted packet(s) are retransmitted in the following A-MPDU. As a result, the potential benefits of frame aggregation are significantly reduced.

Network Coding (NC) has emerged as one of the most promising information theoretic techniques for improving the performance of computing networks. Several recent studies have applied Random Linear Coding (RLC) techniques to mitigate the HARQ unicast retransmission overhead in wireless broadband networks. In general, RLC has shown significant benefits in wired/wireless networks and is expected to yield similar benefits in 802.11n/ac networks with frame aggregation features.

In order to solve the problem(s), the present invention introduces a method for frame aggregation transmission of wireless network system with network coding to improve transmission efficiency.

SUMMARY OF THE INVENTION

In general, a method for frame aggregation transmission of wireless network system is provided having various aspects addressed to overcome the shortcomings in prior frame aggregation transmission discussed above and provides certain other advantages.

The primary objective of the present invention is to provide a method for frame aggregation transmission, which uses network coding for IEEE 802.11n based on random linear coding to fill A-MPDU with new MPDUs and guarantee the order of MPDU.

Another objective of the present invention is to provide a wireless communication device for frame aggregation transmission to improve the transmission efficiency in 802.11n/ac networks.

Additional aspects and advantages of the present invention will be set forth in part in the description which follows and, in part, will be obvious from the description.

In order to accomplish the aforementioned objective, the method for frame aggregation transmission of the preferred embodiment of the present invention includes:

transmitting at least one aggregated frame over at least one channel and receiving in return at least one block acknowledgement based on the aggregated frame received;

selecting a coding scheme for a plurality of data units to generate a plurality of coded packets and providing at least one decoding information in the coded packets for a decoding scheme;

aggregating the coded packets in a new aggregated frame;

creating a frame aggregation transmission through the channel; and receiving the aggregated frame and decoding the coded packets to process the data units.

It is to be noted from the objectives of the preferred embodiment of the present invention that an efficient frame aggregation transmission scheme based on random linear coding is proposed to improve the transmission efficiency in 802.11n/ac networks. Depending on the network conditions, the proposed scheme dynamically utilizes either systematic coding or mixed generation coding to maximize the use of the pre-defined aggregate frame. An analytical model is developed for evaluating the performance of the proposed scheme. Simulation results show the proposed method has a notably better goodput than existing schemes such as SW and ASR-ARQ.

DETAILED DESCRIPTION OF THE INVENTION

The following description is merely exemplary in nature and is in no way intended to limit the present teachings, applications, or uses. Those of skill in the art will recognize that the following description is merely illustrative of the principles of the invention, which may be applied in various ways to provide many different alternative embodiments.

Accordingly, the invention of method for frame aggregation transmission discloses a new scheme designated as Frame Aggregation transmission using Random linear coding (FAR) for improving the transmission efficiency of 802.11n/ac networks. One embodiment of the method includes:

transmitting at least one aggregated frame over at least one channel and receiving in return at least one block acknowledgement based on the aggregated frame received, and the block acknowledgement contains the number of data units for retransmission;

selecting a coding scheme for a plurality of data units to generate a plurality of coded packets and providing at least one decoding information in the coded packets for a decoding scheme, wherein the coding scheme codes the retransmitted data units and the new data units to generate a determined N coded packets containing a plurality of decoding information for a decoding scheme;

aggregating the coded packets in a new aggregated frame including a plurality of retransmitted data units and a plurality of new data units, wherein the aggregated frame is a MAC layer frame and the data units are MPDUs (MAC Protocol Data Units);

creating a frame aggregation transmission through the channel; and receiving the aggregated frame and decoding the coded packets to process the data units.

The data units that were not correctly received are retransmitted with the new data units in next frame aggregation transmission.

If current frame aggregation transmission is totally decoded, the coding scheme codes the new data units to generate a determined N coded packets containing a plurality of decoding information for a decoding scheme. And redundant coded packets generated from the new data units are transmitted along with the new data units in the next aggregated frame.

Figure 1:
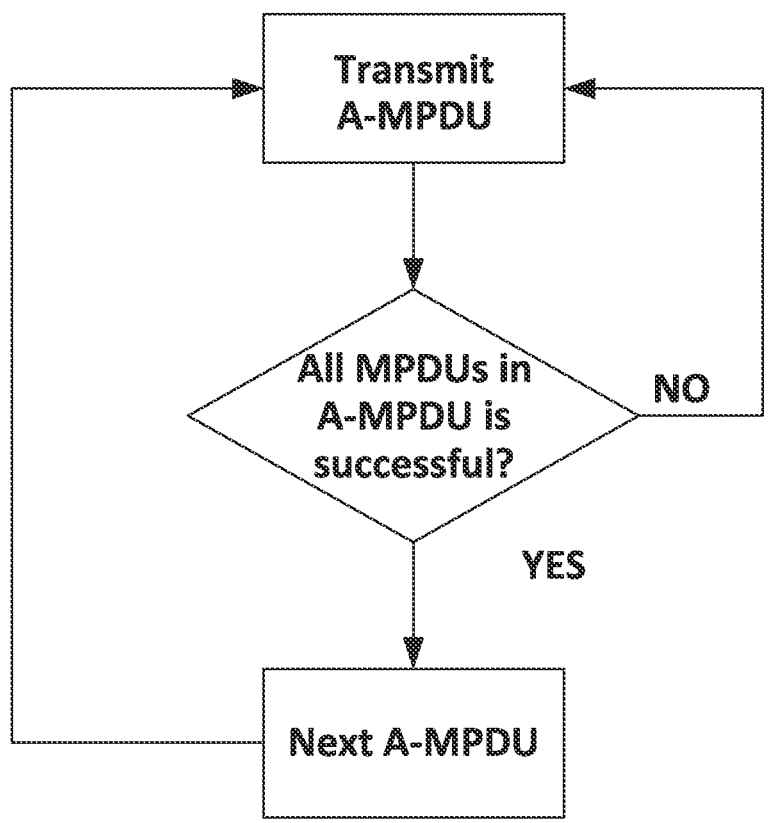
FIG. 1 is a flowchart of stop and wait scheme of a prior art frame aggregation transmission.
Figure 2:
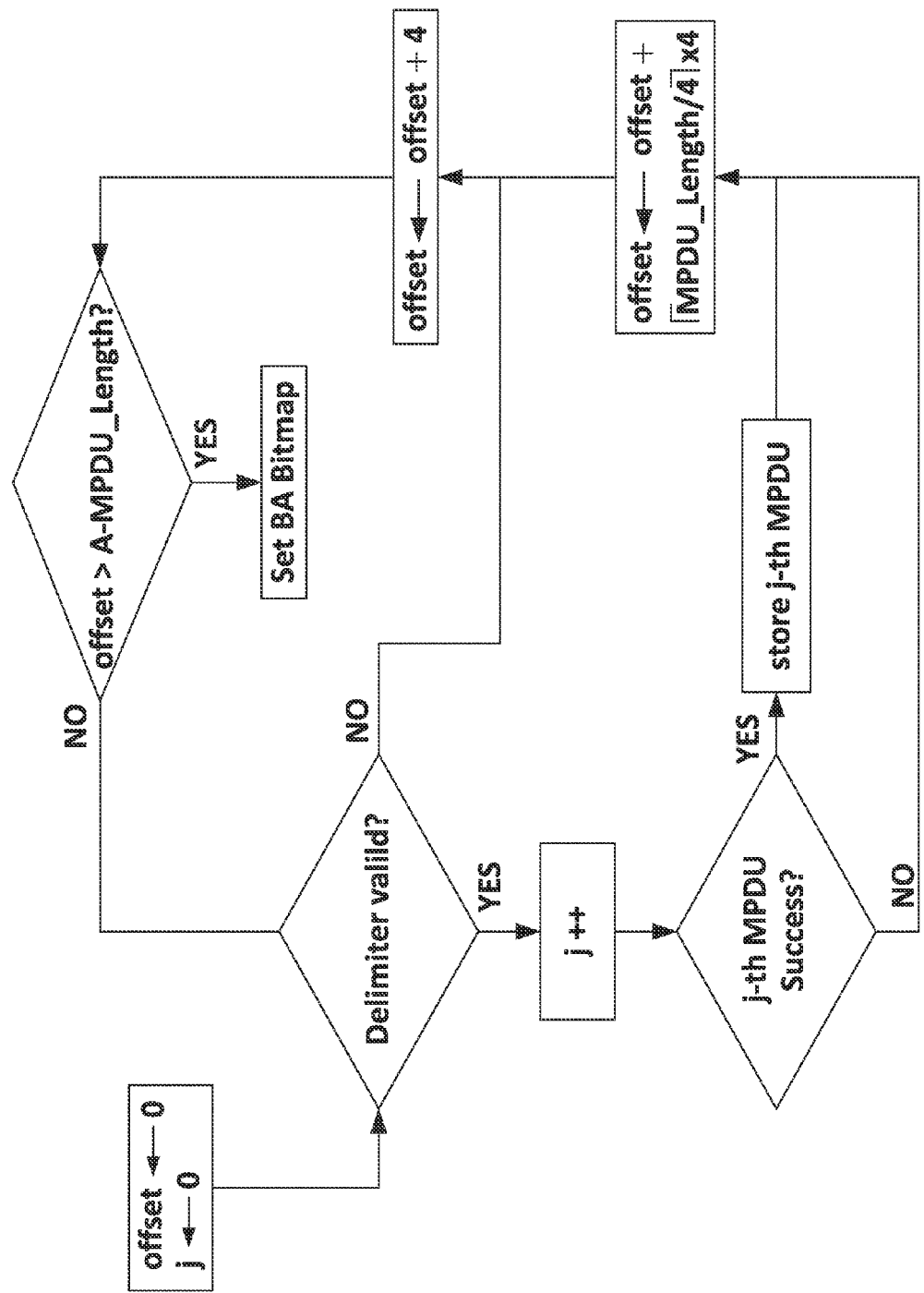
FIG. 2 is a flow diagram of MPDUs de-aggregation procedure for ASR-ARQ scheme of a prior art frame aggregation transmission.
Figure 3:
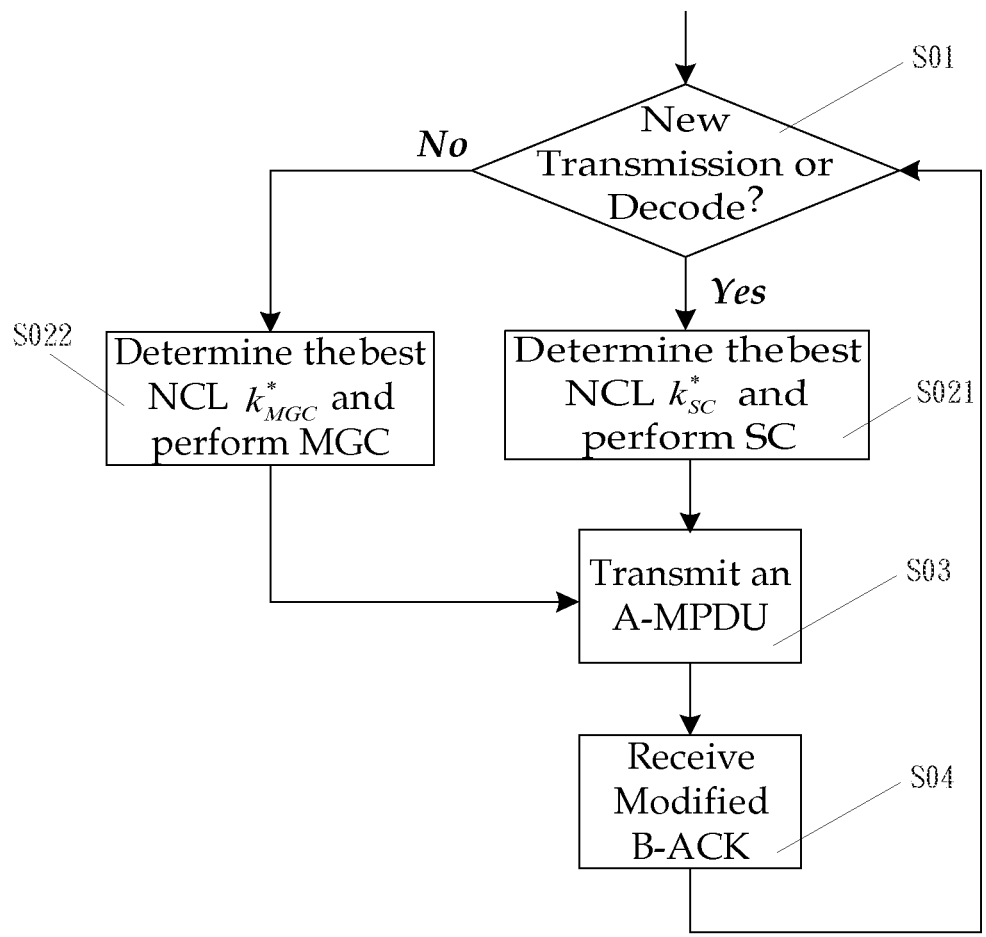
FIG. 3 is a flow diagram of Frame Aggregation transmission method using Random linear coding according to the preferred embodiment of the present invention.

With references to FIG. 3, a flow diagram shows a Frame Aggregation transmission method using Random linear coding (FAR) according to the preferred embodiment of the present invention.

The invention considers the Aggregate MAC Protocol Data Unit (A-MPDU) technique in the 802.11n standard, which concatenates multiple MPDUs with a single leading PHY header. But the method of invention may be applied to other network or wireless network protocols, if it is applicable. Neglecting the control overhead of A-MPDU, the pre-defined size of the A-MPDU is denoted as $L_a$ while that of each MPDU is denoted as $L_m$. Thus, each A-MPDU contains $N=L_a/L_m$ MPDUs (transmission opportunities, TxOps). Note that the pre-defined size of an A-MPDU can be computed according to the network conditions.

In Random Linear Coding (RLC), a generation G is defined as the number of native packets $p=[p_1, p_2, \ldots, p_k]$ starting from the head of the transmission queue. Moreover, k represents the Coding Length (CL). The invention assumes each MPDU corresponds to a RLC packet. Thus, each of the N TxOps transmits either a native packet or a coded packet. Both packets contain a linear combination of the k native packets, together with the random encoding coefficients used in the linear combination process. To reduce the coefficient overhead, a random seed method is used to convey the coefficients required for the decoding process in one embodiment.

For each packet, the seed has a size of 4 bytes. Therefore, the native and coded packets each comprise $L_m=h+l+32$ bits, where h is the number of bits allocated for the control overhead (i.e., the header and CRC) and l is the number of payload bits for the linear combination of all k native packets (i.e., $L_m$). The coefficients are randomly chosen from a Galois Field $\mathbb{F}_q$ with a size of $q=2^m$. In one embodiment, an assumption is made that the field size is sufficiently large that the linearly independent probability of the packets received at the receiver is equal to approximately one. However, the use of this assumption simplifies the expressions and provides a good approximation for large q. Bit error at the receiver is assumed to follow a Bernoulli trial with probability $Pr_{BER}$. Thus, the Packet Error Rate (PER) is calculated as equation (1):

$$Pr_{PER}=1-(1-Pr_{BER})^{L_m}. \qquad (1)$$

Accordingly, the present invention discloses a combined SC (Systematic Coding)/MGC (Mixed Generation Coding) coding scheme (i.e., FAR) based on the concept of packet-level FEC (Forward Error Correction) to reduce the number of retransmissions. In the embodiment Frame Aggregation transmission using Random linear coding (FAR) comprises SC/MGC scheme. Importantly, the scheme differs from conventional packet-level FEC in that the MGC element of the coding scheme efficiently exploits the benefits of frame aggregation in recovering the packets described in following.

As shown in step S01 of FIG. 3, when the sender begins a new transmission, or all of the previous generations have been successfully decoded, the SC technique of step S021 is used for coding purposes. Specifically, given N TxOps within an A-MPDU transmission, the best CL for SC, i.e., $k^*_{SC}$, is computed as equation (2):

$$k^*_{SC}=\lfloor N(1-Pr_{PER})\rfloor. \qquad (2)$$

Having determined $k^*_{SC}$, generation G is coded using SC to produce a series of packets comprising $k^*_{SC}$ native packets and $N-k^*_{SC}$ coded packets for the current A-MPDU transmission. Note that the coded packets serve as redundant packets which allow the receiver to extract all of the useful information within an A-MPDU even if some of the packets are lost or corrupted. The packets within the A-MPDU are given as equation (3):

$$CP_i = \begin{cases} p_i & 1 \leq i \leq k^*_{SC} \\ \sum_{j_1=1}^{k^*_{SC}} c_{i,j_1} p_{j_1} & k^*_{SC} < i \leq N, \end{cases} \qquad (3)$$

where $p_1, p_2, \ldots, p_{k^*_{SC}}$ are the native packets and $c_{i,j_1}$ is a random coefficient. Note that the coefficient of the $i^{th}$ native packet is a unit vector having a one in the $i^{th}$ coordinate and zeros elsewhere. In Step S03 the A-MPDU is transmitted.

To successfully decode generation G, the receiver must receive at least $k^*_{SC}$ packets. Having successfully decoded generation G, the receiver informs the sender by transmitting the modified B-ACK message. The sender receives the modified B-ACK at step S04, and then flushes the native packets p from the corresponding queue. In the event that imperfect channel conditions prevent the receiver from receiving sufficient packets to decode the current generation, the receiver informs the sender of the number of additional coded packets required to decode the generation via the modified B-ACK.

When the sender receives the modified B-ACK, the MGC scheme at the step S022 is used to code the packets for the following A-MPDU given the pre-defined A-MPDU size. In contrast to the best CL computed in the SC scheme, the best CL in the MGC scheme is based not only on the packet error rate $Pr_{PER}$ and the number of TxOps in the current transmission, but also on the number of additional packets r required to recover the previous generation. In other words, the best CL is given as equation (4):

$$k^*_{MGC} = \lfloor N(1-Pr_{PER})-r \rfloor. \quad (4)$$

Once $k^*_{MGC}$ has been determined, the sender uses MGC to form a concatenated series of packets comprising both mixed native packets and mixed coded packets. This embodiment enables the retransmitted packets to be embedded in the current A-MPDU transmission; thereby achieving both a packet delivery order guarantee and a high linearly independent probability of the received packets. Each packet in the MGC-coded A-MPDU has the form (5):

$$MP_i = \begin{cases} \left(\sum_{j_2=1}^{k^*_{pre}} c_{i,j_2} p_{j_2}\right) + p_i, & 1 \le i \le k^*_{MGC} \\ \sum_{j_3=1}^{k^*_{pre}} c_{i,j_3} p_{j_3} + \sum_{j_4=1}^{k^*_{MGC}} c_{i,k^*_{pre}+j_4} p_{j_4}, & k^*_{MGC} < i \le N, \end{cases} \quad (5)$$

where $p_1, p_2, \ldots, p_{k^*_{pre}}$, and $p_1, p_2, \ldots, p_{k^*_{MGC}}$ are the corresponding native packets of the previous and current generations. The parameters $c_{i,j_2}$, $c_{i,j_3}$, and $c_{i,j_4}$ are the random coefficients. As shown in Eq. (5), the native packet information of the previous generation is coded with that of the current generation. Thus, provided that the receiver receives $k^*_{MGC}+r$ packets, all of the native packets of the previous and current generations can be successfully extracted since any mixed packet can be used to recover a packet from either the previous generation or the current generation. If sufficient amount of packets are not received, the receiver informs the sender of the number of additional packets required by means of the modified B-ACK message. Note that once the current generation can be decoded, all of the previous generations can also be decoded, and thus the packet delivery order is guaranteed.

From the above description, one embodiment of the method for frame aggregation transmission includes:

receiving an statistical packet error rate based on channel quality, transmission opportunities N, linearly independent probability that the receiver will receive k mixed packets, and an indicator value of not correctly received packets;

calculating a network coding length k based on the statistical packet error rate, the transmission opportunities N and the indicator value;

using MGC (Mixed Generation Coding) to generate k mixed native packets and N−k mixed coded packets from a plurality of retransmitted packets, and a plurality of new packets;

using MGC to produce a plurality of random coefficients corresponding to the mixed coded packets;

using MGC to decode the mixed coded packets with the random coefficients even if some mixed coded packets are lost;

creating a frame aggregation of mixed coded packets for transmission through a MAC layer, and the frame aggregation is a MAC layer frame;

receiving the frame aggregation and decoding the mixed coded packets; and sending a block acknowledgement based on the not correctly received mixed coded packets.

In the receiving node, the received A-MPDU is composed of mixed coded packets over a channel in an aggregated frame transmission, and the mixed coded packets have a plurality of corresponding coding coefficients, which are linear dependent. The receiving node determines mixed coded packets that are in error, and correctly received mixed coded packets and their coding coefficients to recover the mixed coded packets received with errors. Lastly, the receiving node may send a response in its BlockACK signal to the transmitting node indicating the errors the errors in the mixed coded packets. The response is an indicator value of not correctly received packets.

Figure 4:
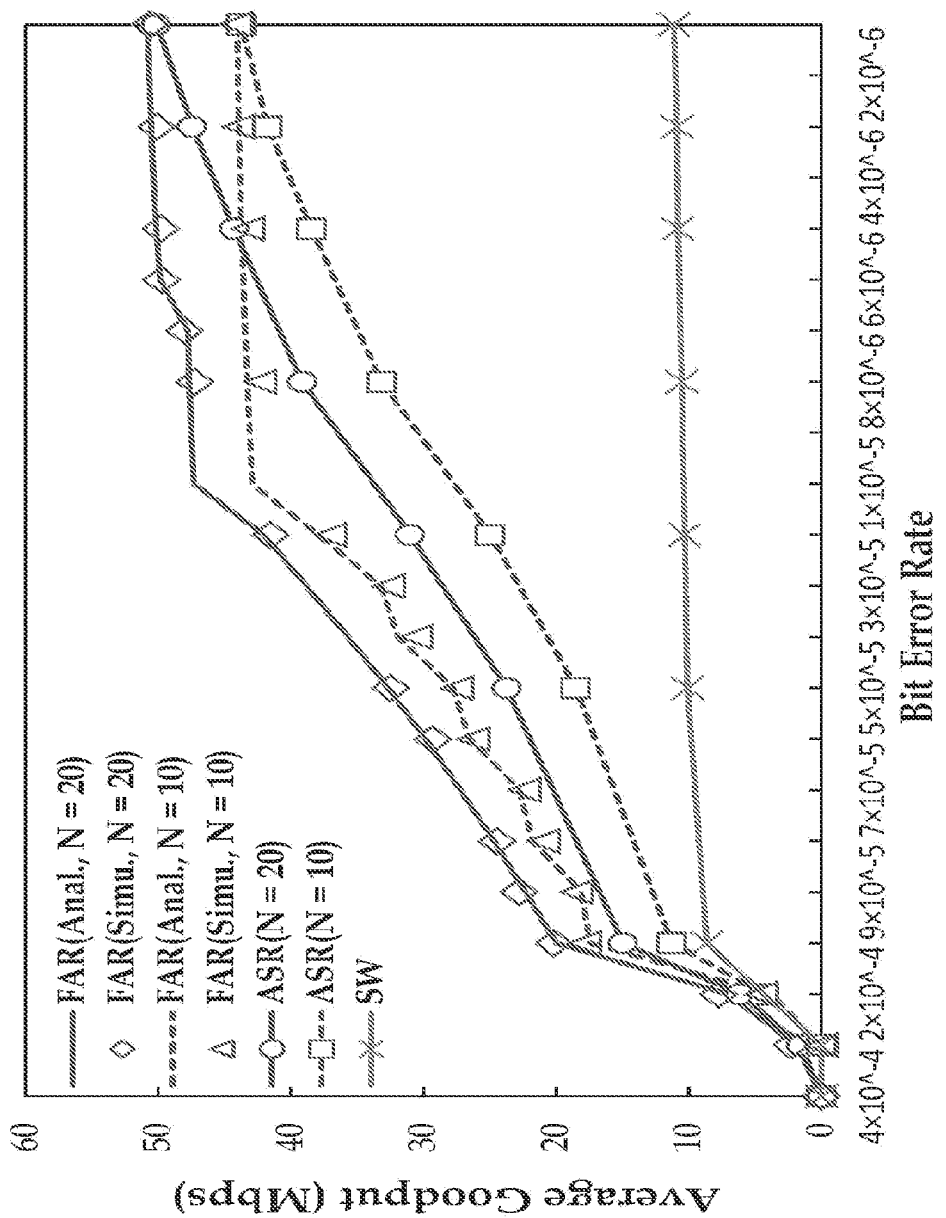
FIG. 4 and FIG. 5 illustrate the variation of the average goodput and packet delay with the BER for the FAR, SW-ARQ and ASR-ARQ schemes as a function of the A-MPDU size.
Figure 5:
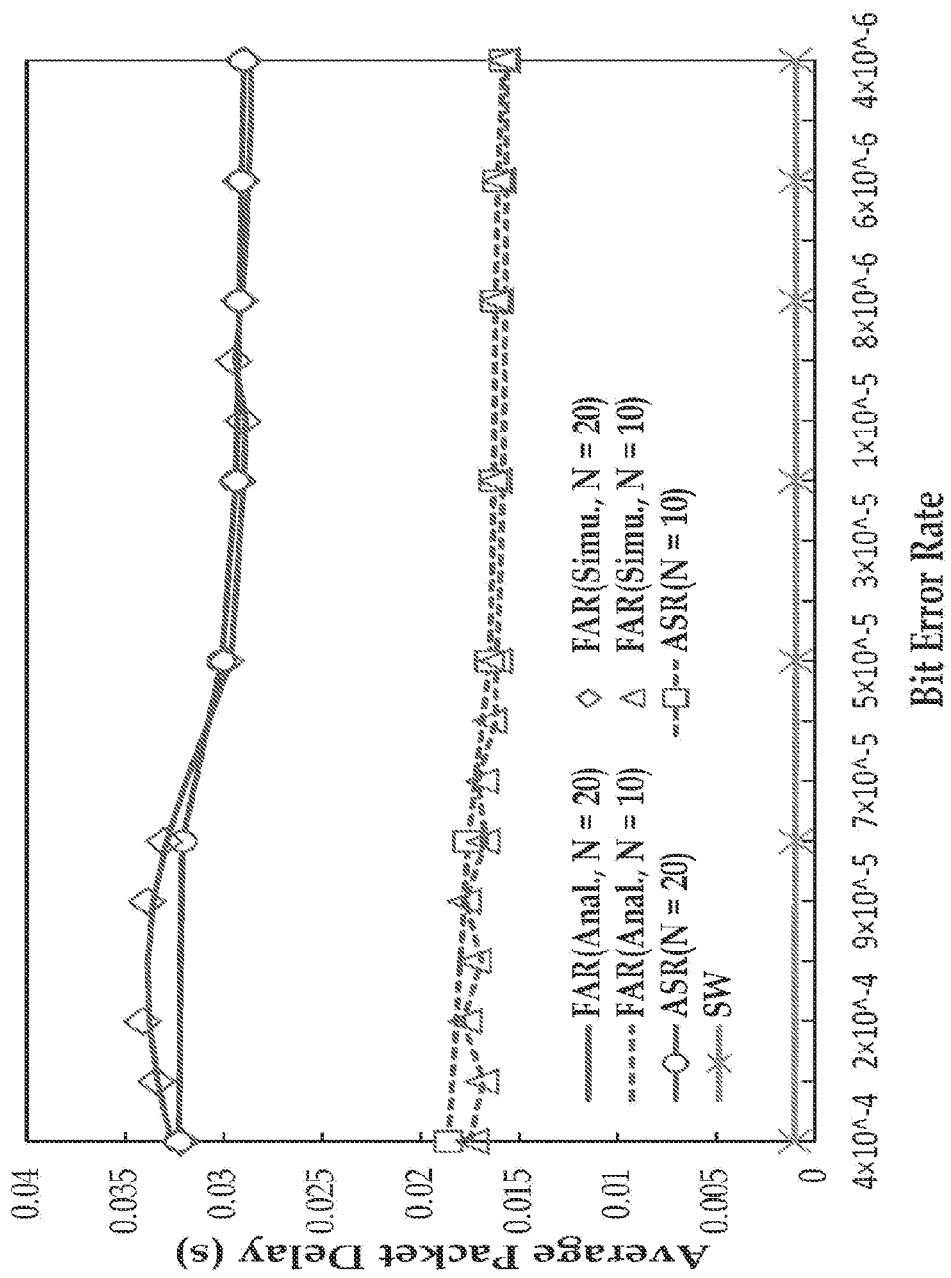

FIG. 4 and FIG. 5 illustrate the variation of the average goodput and packet delay with the BER for the FAR, SW-ARQ and ASR-ARQ schemes as a function of the A-MPDU size (i.e., N packets in an A-MPDU). The performance of the proposed scheme was compared with that of the SW-ARQ and ASR-ARQ schemes in terms of the average goodput and average packet delay.

The invention of FAR achieves both higher average goodput than the other two schemes. For a BER of $10^{-4}$ and an A-MPDU size of 10, FAR has a 58% goodput improvement over ASR-ARQ. The superior goodput performance of FAR is a result of the combined SC and MGC coding strategy, which reduces the number of retransmissions required to decode the generation and more efficient use of the pre-defined A-MPDU size.

Conversely, the poor performance of ASR-ARQ stems from the use of a selective retransmission strategy and low bandwidth utilization due to the lack of a frame aggregation policy in the retransmission process. In addition, the average packet delay of FAR is consistence with ASR-ARQ. The SW-ARQ has the lowest average packet delay since it does not consider the frame aggregation and thus the transmission time can be reduced. In both figures, a good agreement exists between the analytical results and the simulation results. Thus, the basic validity of the proposed analytical model is confirmed.

The invention has presented a method designated as Frame Aggregation transmission using Random linear coding (FAR) for improving the transmission efficiency of 802.11n/ac networks. FAR not only employs the concept of packet-level FEC, but also uses a mixed generation coding transmission strategy. As a result, FAR reduces the retransmission overhead, simultaneously takes the potential benefits of A-MPDU for retransmission, while providing packet deliver order guarantee/making maximum use of the available transmission opportunities within the pre-defined A-MPDU. Simulation results show FAR notably outperforms SW and ASR-ARQ in terms of both the average goodput. Also, the average delay of FAR is consistence with ASR-ARQ. The results obtained using the proposed analytical model are in good agreement with the simulation results.

The present invention can also be embodied as computer-readable codes on a computer-readable recording medium to perform the above-described methods. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish general inventive concept of the present invention can be easily construed by programmers skilled in the art to which the present general inventive concept pertains.

Figure 6:
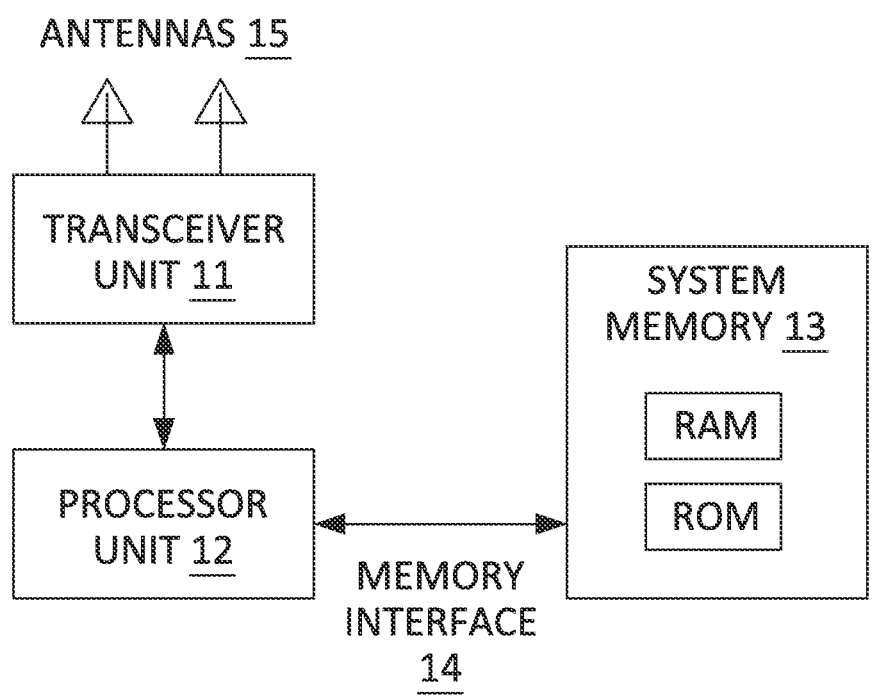
FIG. 6 is a wireless communications device for frame aggregation transmission of wireless network system according to the embodiment of the present invention.

As shown in FIG. 6, wireless communications device 10 includes a radio to allow communication in an RF/location space with other devices. Accordingly, communications device 10 may operate in a wireless network such as, for example, a Wireless Local Area Network (WLAN), a Wireless Personal Area Network (WPAN), or a combination thereof. Communications device 10 is any type of wireless device capable of communicating in an RF/location space with another device that is capable of using an algorithm that monitors and controls packet aggregation techniques to improve the performance and effective throughput in networks.

A transceiver unit 11 both receives and transmits a modulated signal from multiple antennas. In one embodiment a Multiple-in, Multiple-out (MIMO) system utilizes multiple antennas at both the transmitter and receiver side to provide that independent data streams are simultaneously transmitted from different antennas. The transceiver unit 11 is coupled to a channel and receives a statistical packet error rate based on channel quality, transmission opportunities, and an indicator value of not correctly received packets. Further, the transceiver unit 11 may calculate an indicator value of the channel quality directly from a received packet. Alternatively, at least one packet may be transmitted over a channel and an indicator value of the channel quality based on the packet transmitted may be received in return. A modulation and coding scheme is then selected for data packets transmitted over the channel that would achieve a desired statistical packet error rate based on the channel quality indicator value. Data packets may be collected using the selected modulation and coding scheme to create an aggregated data transmission.

A processor unit 12, in general, processes functions that fetch instructions, generate decodes, find operands, and perform appropriate actions, then stores results. The processor unit 12 may include baseband and applications processing functions and utilize one or more processor cores dedicated to handle application specific functions and allow processing workloads to be shared across the cores. The processor unit 12 may transfer data through an interface 14 to a system memory 13 that may include a combination of memories such as a Random Access Memory (RAM) and a Read Only Memory (ROM), although neither the type nor variety of memories included in system memory 13 is a limitation of the present invention.

The architecture of wireless communications device 10 includes, among other layers, a Media Access Control (MAC) layer and a PRY layer. The MAC level operates a management block to control MAC protocol data units (MPDUs) that dictate the process for moving data packets to and from an interface across a shared channel while the PHY layer provides the hardware for sending and receiving bit stream signals on a carrier through the network.

Wireless communications device 10 employs functional logic and various methods in the MAC layer to dynamically create and send information MPDUs in an aggregated transmission along with packet level FEC MPDUs. Forward Error Correction (FEC) is a system of error control for data transmission, a technique that allows the receiver to correct errors in the currently received data.

Accordingly, the process unit 12 has a management block configured to calculate a network coding length k based on the statistical packet error rate, the transmission opportunities N, linearly independent probability that the receiver will receive k mixed packets, and the indicator value, and decode a plurality of retransmitted MPDUs (MAC Protocol Data Units), a plurality of new MPDUs to generate a plurality of mixed coded packets into an A-MPDU for a aggregated frame transmission. In one embodiment the process unit 12 uses random linear networking coding to relate the mixed coded packets with random coefficients, and in receiving end the received coded packets having relative linear dependent coefficients is decoded.

FAR not only employs the concept of packet-level FEC, but also uses a mixed generation coding transmission strategy. As a result, FAR reduces the retransmission overhead, simultaneously takes the potential benefits of A-MPDU for retransmission, while providing packet deliver order guarantee/making maximum use of the available transmission opportunities within the pre-defined A-MPDU.

Furthermore, the disclosed invention provides an efficient frame aggregation transmission method based on random linear coding to improve the transmission efficiency in 802.11n/ac networks. Depending on the network conditions, the method and device dynamically utilizes either systematic coding or mixed generation coding to maximize the use of the pre-defined aggregate frame. The FAR notably outperforms SW and ASR-ARQ in terms of both the average goodput. Also, the average delay of FAR is consistence with ASR-ARQ. The wireless communications device selects a coding scheme to transmit data packets over the channel based on the expected error transmission rate.

It is to be noted that although the preferred embodiment of the present invention has been described, other modifications, alterations or minor change to the structure should still be within the scope defined in the claims. As those skilled in the art will readily observe that numerous modifications and alterations of the device and method may be made while retaining the teachings of the invention.

What is claimed is:

1. A method for frame aggregation transmission of wireless network system, comprising:
  receiving an statistical packet error rate based on channel quality, transmission opportunities N, linearly independent probability that the receiver will receive k mixed packets, and an indicator value of not correctly received packets;
  calculating a network coding length k based on the statistical packet error rate, the transmission opportunities N and the indicator value;
  using Mixed Generation Coding (MGC) to generate k mixed native packets and N−k mixed coded packets from a plurality of retransmitted packets and a plurality of new packets, wherein the MGC is given as an equation of:

$$MP_i = \begin{cases} \left(\sum_{j_2=1}^{k^*_{pre}} c_{i,j_2} p_{j_2}\right) + p_i, & 1 \leq i \leq k^*_{MGC} \\ \sum_{j_3=1}^{k^*_{pre}} c_{i,j_3} p_{j_3} + \sum_{j_4=1}^{k^*_{MGC}} c_{i,k^*_{pre}+j_4} p_{j_4}, & k^*_{MGC} < i \leq N \end{cases},$$

where $p_1, p_2, \ldots, p_{k^*_{pre}}$ and $p_1, p_2 \ldots, p_{k^*_{MGC}}$ are corresponding native packets of the previous and current generations, the parameters $c_{i,j_2}$, $c_{i,j_3}$, and $c_{i,j_4}$ are a random coefficients, wherein the $k^*_{MGC}$ is given as equation:

$$k^*_{MGC} = \lfloor N(1 - Pr_{PER}) - r \rfloor,$$

where the r is additional packets, the $Pr_{PER}$ is given as equation:

$$Pr_{PER} = 1 - (1 - Pr_{BER})^{L_m},$$

where the $L_m = h+l+32$ bits, h is a number of bits allocated for a control overhead and l is a number of payload bits for the linear combination of all k native packets, wherein bit error at the receiver is assumed to follow a Bernoulli trial with probability $Pr_{BER}$;

creating a frame aggregation of mixed coded packets for transmission through a MAC layer; and receiving the frame aggregation and decoding the mixed coded packets.

2. The method for frame aggregation transmission of wireless network system as claimed in claim 1, further including using Mixed Generation Coding to produce a plurality of random coefficients corresponding to the mixed coded packets.

3. The method for frame aggregation transmission of wireless network system as claimed in claim 2, wherein the frame aggregation is a MAC layer frame.

4. The method for frame aggregation transmission of wireless network system as claimed in claim 2, further including using Mixed Generation Coding to decode the mixed coded packets with the random coefficients even if some mixed coded packets are lost.

5. The method for frame aggregation transmission of wireless network system as claimed in claim 4, further including sending a block acknowledgement based on the not correctly received mixed coded packets.

6. The method for frame aggregation transmission of wireless network system as claimed in claim 2 or 4, further including using Mixed Generation Coding to decode the mixed native packets and coded packets if received packets are sufficient to decode.

* * * * *